MODULATION SYSTEM

Filed May 24, 1957

INVENTORS
HARRY KIHN
WILLIAM E. BARNETTE
& SIDNEY METZGER
BY
Charles H. Brown
ATTORNEY Oct. 4, 1960

H. KIHN ET AL 2,955,264

MODULATION SYSTEM

Filed May 24, 1957

2 Sheets-Sheet 2

INVENTORS
HARRY KIHN
WILLIAM E. BARNETTE
& SIDNEY METZGER
BY
Charles H. Brown
ATTORNEY 2,955,264

MODULATION SYSTEM

Harry Kihn, Lawrenceville, N.J., William E. Barnette, Levittown, Pa., and Sidney Metzger, Princeton, N.J., assignors to Radio Corporation of America, a corporation of Delaware Filed May 24, 1957, Ser. No. 661,486

7 Claims. (Cl. 332—12)

Figure 1:
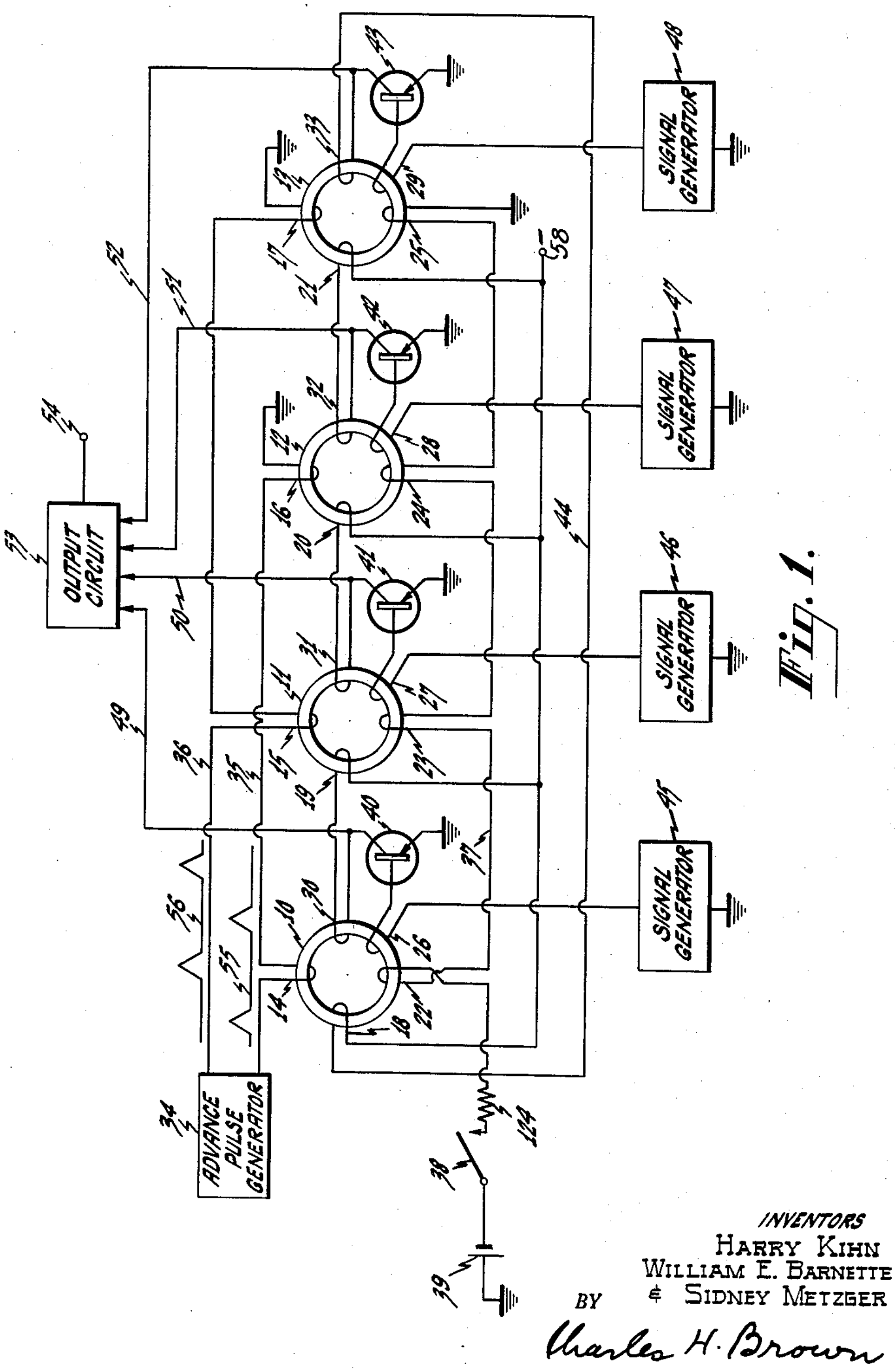

The invention relates to modulation systems. It particularly relates to a multiplex modulation system including a transistorized magnetic core ring counter circuit.

In present multiplex modulation systems, an electronic or mechanical commutator is provided which functions to sequentially turn on or sample a plurality of modulator stages. The modulator stages are each individually connected to a different source of signal energy. As each modulator stage is turned on by the commutator, a modulated output signal is produced in a desired manner by the modulator stage according to the signal energy applied to the modulator stage during the sampling interval. The output circuits of the respective modulator stages are all connected to a common output circuit so that the modulated output signals produced sequentially by the modulator stages and originating over separate channels are made available for transmission over a single communication path in multiplex fashion.

Multiplex modulation systems of the type described require the use of both commutating and channel modulating equipment. Such systems tend to be expensive to construct and maintain in terms of the number and type of components used and the resulting power consumption. In addition, the size and the number of the components required creates problems in the design and packaging of equipment including such multiplex modulation systems.

It is an object of the invention to provide an improved modulation system.

It is a further object to provide a novel multiplex modulation system including a transistorized magnetic core ring counter circuit arrangement.

Another object is to obtain a novel multiplex modulation system in which the commutating and modulating functions for each channel are perfomed by a single circuit including a magnetic core and a transistor.

A still further object is to provide a multiplex modulation system using magnetic cores and transistors which is more compact in construction and simpler in operation than the multiplex modulation systems now known.

In accordance with the invention, a plurality of magnetic cores each having a transistor circuit regeneratively coupled thereto are arranged so as to form a chain or train of magnetic cores. The output circuit of the last magnetic core-transistor circuit in the chain is connected to the input circuit of the first magnetic core-transistor circuit in the chain, thereby producing a ring counter circuit arrangement. Means are provided for establishing a single electrical condition in one of the magnetic cores and for advancing the electrical condition from magnetic core to magnetic core along the chain continually. A separate source of signal energy is connected to each transistor-magnetic core circuit included in the chain of magnetic cores. As the electrical condition is advanced from magnetic core to magnetic core along the chain of magnetic cores, the magnetic core-transistor circuits are made to function sequentially as modulator stages to each produce, in turn and in a desired manner, a modulated output signal. The modulated output signal produced by each magnetic core-transistor circuit is determined according to the signal energy supplied to the magnetic core-transistor circuit from the source connected thereto. In other words, the ring counter action obtained by advancing the electrical condition along the chain of magnetic cores on a continual basis causes first one and then another of the magnetic core-transistor circuits to sample the signal energy applied thereto. Each of the magnetic core-transistor circuits produces a modulated output signal in a desired manner, according to the signal energy applied to the magnetic core-transistor circuit from the source during the sampling interval.

The modulated output signals sequentially produced by the respective magnetic core-transistor circuits in the chain are applied to a common output circuit. The common output circuit functions to combine the modulated output signals originating over the separate channels such that the modulated output signals are available for transmission over a single communication path in multiplex fashion. In one embodiment of the invention, a pulse time multiplex modulation output is obtained in the common output, while in another embodiment a pulse amplitude multiplex modulation is obtained in the common output.

Figure 2:
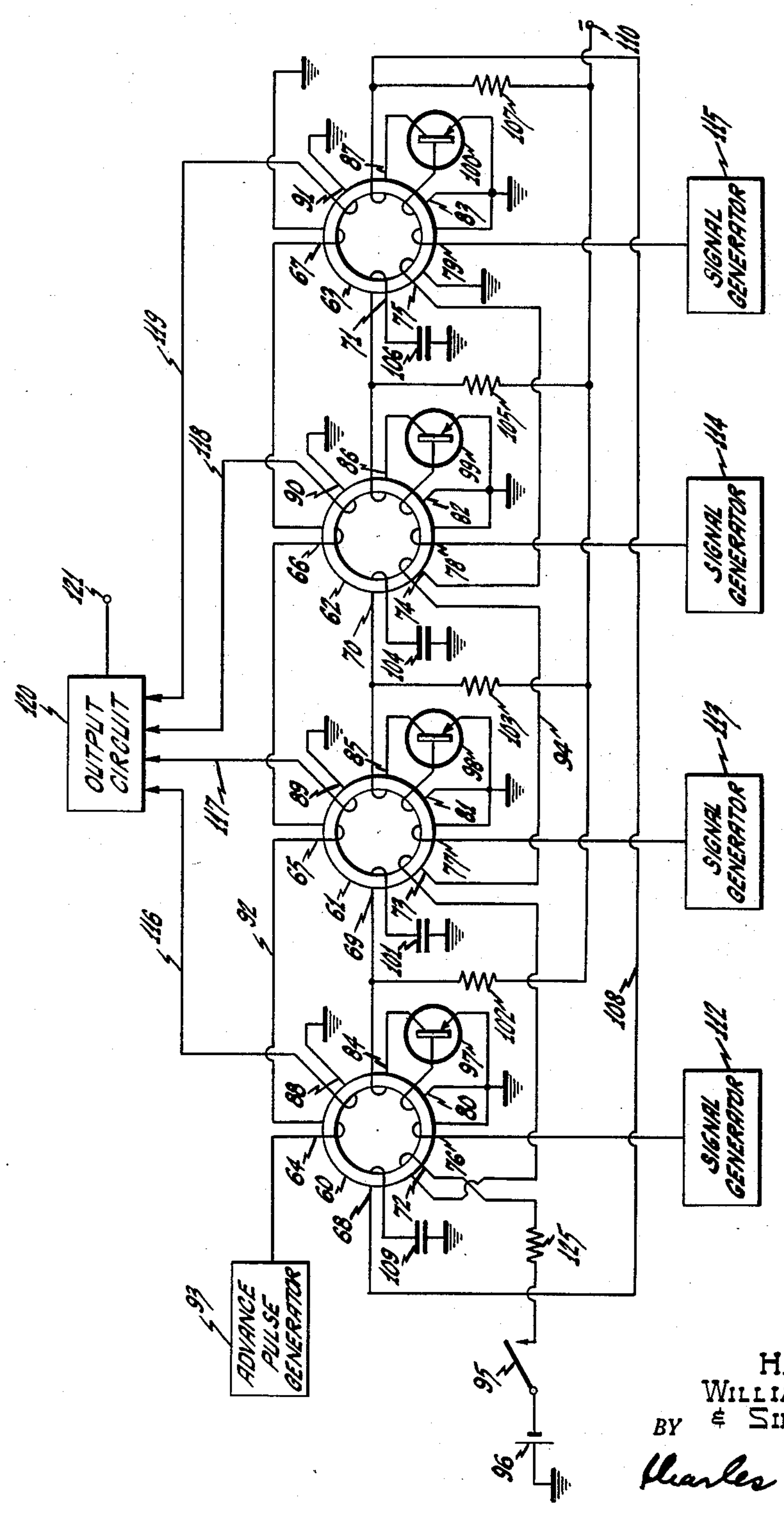

A more detailed description of the invention will now be given in connection with the accompanying drawing, in which:

Figure 1 shows a circuit diagram of a pulse time multiplex modulation system constructed according to the invention; and Figure 2 shows a circuit diagram of a further embodiment of the invention.

Referring to Figure 1, there is shown a chain of magnetic cores 10 through 13. The operation and construction of magnetic cores per se is known in the art and, therefore, a detailed description thereof is unnecessary. A magnetic core is a circuit element having a substantially rectangular hysteresis loop of low coercive force. Certain materials such as molybdenum Permalloy and zinc-magnese-magnesium ferrite exhibit a substantial rectangular hysteresis loop. A magnetic core is capable of being magnetized to saturation in either one of two directions. In one direction, a positive or active state is said to arise in which the direction of retentivity is opposite to that which would result from the application of a shift or sensing pulse to the magnetic core. In the second direction, a negative or inactive state is said to arise in which the direction of retentivity is the same as that which would result from the application of a shift pulse to the magnetic core.

A magnetic core in the active or positive state is said to contain a "one," and a magnetic core in the negative or inactive state is said to contain a "zero." When a magnetic core is shifted from an active state to an inactive state, a voltage is induced in an output winding on the core resulting in a current flow through the output winding of one polarity. A voltage is induced in the output winding on the core when the magnetic core is shifted from an inactive to an active state such that a current of the opposite polarity flows through the output winding. The polarity of the current flow through the output winding will in each case depend upon the direction in which the output winding is wound on the core.

Five windings or coils are mounted on each of the magnetic cores 10 through 13. Reading in a counter-clockwise direction, the windings are designated as an advance or trigger winding 14 through 17, an input winding 18 through 21, a set winding 22 through 25, a transistor base winding 26 through 29 and a transistor collector or output winding 30 through 33, respectively. The advance windings 14, 16 on the respective magnetic cores 10, 12 are connected in series to an advance pulse generator 34 over a lead 35, and the advance windings 15, 17 on the respective magnetic cores 11, 13 are connected in series to the pulse generator 34 over a second lead 36. The set windings 22 through 25 are connected in series over an electrical path including a lead 37, on-off switch 38, a resistor 124 and a source of potential represented by a battery 39. As shown in the drawing, the set winding 22 is wound on the magnetic core 10 in a direction opposite to that in which the set windings 23 through 25 are wound on the magnetic cores 11 through 13, respectively.

A separate P–N–P junction transistor of N type conductivity is regeneratively coupled to each of the magnetic cores 10 through 13. The transistors 40 through 43 are each arranged to be normally non-conducting. The base electrode of transistor 40 is connected to one end of the base winding 26, while the collector electrode of transistor 40 is connected to one end of the collector winding 30 on the magnetic core 10. The emitter electrode of the transistor 40 is connected to ground. The term ground, as used in the specification, is to be understood as referring to a point of fixed or zero alternating current reference potential. Transistors 41 through 43 are connected to the magnetic cores 11 through 13, respectively, in the same manner. By way of example, the transistors 40 through 43 may be of the type designated in the art as 2N105. However, other types of P–N–P junction transistors of N type conductivity may be used without departing from the spirit of the invention.

In order to provide a ring counter according to the invention, the output winding on each of the magnetic cores 10 through 13 is connected to the input winding on the succeeding magnetic core. Thus, the end of the output winding 30 on the magnetic core 10 opposite to the end thereof connected to the collector electrode of the transistor 40 is connected to one end of the input winding 19 on the next magnetic core 11, the other end of the input winding 19 being connected to the negative terminal 58 of a source of potential. The output winding 31 on the magnetic core 11 is connected to the input winding 20 on the magnetic core 12 and the output winding 32 on the magnetic core 12 is connected to the input winding 21 on the magnetic core 13 in a similar manner. The output winding 33 on the last magnetic core 13 in the chain is connected to the input winding 18 on the first magnetic core 10 over a lead 44 also in a similar manner.

The base electrodes of the transistors 40 through 43 are individually connected through the respective base windings 26 through 29 to ground over separate electrical paths each including a different source of modulating signal energy. The different sources of modulating signal energy are represented in the drawing by the blocks 45 through 48 which are designated as signal generators. The signal generators 45 through 48 may be of any suitable type known in the art and may be designed to produce signal energy in the form of voice, tone or other intelligence. The collector electrodes of the transistors 40 through 43 are connected over separate leads 49 through 52 to a common output circuit 53. The output circuit 53 functions to combine the modulated output signals, which are produced and applied to the output circuit 53 over leads 49 through 52 in a manner to be described, such that the modulated output signals are applied in multiplex fashion to an output terminal 54 for application over a single communication path to a utilization circuit.

In the operation of the embodiment of the invention shown in Figure 1, the normally open switch 38 is first closed. This action completes an electrical path from battery 39 through the series connected set windings 22 through 25. The set windings 23 through 25 are wound on the magnetic cores 11 through 13, respectively, in such a direction that the voltage induced in the set windings 23 through 25 causes the respective magnetic cores 11 through 13 to each assume a "zero" state. If one or more of the magnetic cores 11 through 13 are already in a "zero" state, the status of the magnetic cores is merely confirmed. As previously pointed out, the set winding 22 is wound on the magnetic core 10 in a direction opposite to the direction in which the set windings 23 through 25 are wound on the magnetic cores 11 through 13. The set winding 22 is wound on the magnetic core 10 in such a direction that the voltage induced in the set winding 22 causes the magnetic core 10 to assume a "one" state. If the magnetic core 10 is already in a "one" state, the status thereof is merely confirmed. Upon the release of the switch 38, therefore, magnetic core 10 is in a "one" state and the remaining magnetic cores 11 through 13 are in a "zero" state.

The advance pulse generator 34 functions to supply a first train 55 of advance pulses over lead 35 to the series connected advance windings 14, 16 and to supply a second train 56 of advance pulses over lead 36 to the series connected advance windings 15, 17. The pulses supplied over the respective leads 35, 36 occur at the same rate of repetition or frequency. However, the pulses supplied over one of the leads are delayed, for example, a half period with respect to the pulses supplied over the other lead. In other words, the pulses appearing on one of the leads are one hundred and eighty degrees out of phase with the pulses appearing on the other lead. The separation or phasing of the two advance pulse trains can be other than one-half period or one-hundred and eighty degrees as long as the advance pulse trains are not coincidental. The pulses supplied over the leads 35, 36 by the pulse generator 34 have a unidirectional waveshape with a sloping edge. Such a waveshape may be approximated by a triangular, sawtooth, rectified sine wave or other properly shaped pulse wave. The pulses, for example, may be of three microseconds width at fifty percent of peak amplitude. The pulse generator 34 may be of any suitable type known and may, for example, include a source of sine waves to which the necessary delay and wave shaping circuits are connected.

The advance windings 14 through 17 are wound on the respective magnetic cores 10 through 13 in a direction such that the application of an advance pulse to an advance winding causes the magnetic core upon which the advance winding is wound to assume a "zero" state. When an advance pulse of the pulse train 55 is applied to the advance windings 14 and 16, the status of the magnetic core 12 in a "zero" state is confirmed. Since the magnetic core 10 is in a "one" state, the application of the advance pulse to the advance winding 14 causes the magnetic core 10 to start to shift into a "zero" state. A negative voltage is induced in the base winding 26. As a result, the emitter electrode becomes sufficiently positive with respect to the base electrode of the transistor 40 to cause the transistor 40 to conduct. The current flow through the collector winding 30 causes, due to the direction in which the collector winding 30 is wound on the magnetic core 10, a more negative voltage to be induced in the base winding 26, biasing the base electrode of the transistor 40 more negative. By this regenerative action, the transistor 40 is made to conduct more heavily. When the magnetic core 10 is shifted into the "zero" state thereof, the magnetic coupling through the magnetic core 10 is reduced substantially to zero and the transistor 40 ceases conducting.

During the period in which the transistor 40 is conducting, current flows through the input winding 19 on the next magnetic core 11 in the chain. The input winding 19 is wound on the magnetic core 11 in a direction such that the voltage induced in the input winding 19 by the conduction of the transistor 40 causes the magnetic core 11 to shift into a "one" state. The single electrical condition or "one" state has, therefore, been shifted from the magnetic core 10 to the magnetic core 11. At the time that the magnetic core 11 changes state, a voltage is induced in the base winding 27. However, the base winding 27 is wound in such a direction that a positive voltage is induced therein. As a result, transistor 41 remains nonconducting. Thereafter, an advance pulse of the pulse train 56 is applied from the pulse generator 34 to the advance windings 15, 17 over lead 36. The status of the magnetic core 13 in a "zero" state is confirmed. The application of the advance pulse to the advance winding 15 causes the magnetic core 11 to start to shift into a "zero" state. Transistor 41 conducts according to the regenerative action described. The magnetic core 11 is shifted into a "zero" state, and the magnetic core 12 is shifted into a "one" state. As additional advance pulses are applied to the advance windings 14, 16 over lead 35 and to the advance windings 15, 17 over lead 36 in the alternate manner described, the "one" state is advanced from magnetic core to magnetic core along the chain on a continuous or circulatory basis. A ring counter or commutating action is therefore produced in that first one and then another of the magnetic core-transistor circuits in the chain are placed in operation.

Referring to the magnetic core 10-transistor 40 circuit, the base electrode of the transistor 40 is biased according to the modulating signal supplied by the signal generator 45 in series with the base winding 26. In other words, the transistor trigger threshold point or the time at which the transistor is made to conduct is a function of the modulating signal supplied by the signal generator 45. When the magnetic core 10 is in a "zero" state and an advance pulse is applied to the advance winding 14, the magnetic core 10 remains in a "zero" state and the transistor 40 remains nonconducting. When the magnetic core 10 is in a "one" state at the time an advance pulse is applied to the advance winding 14, the magnetic core 10 starts to shift into a "zero" state. As the advance pulse has a finite rise time, the modulating signal will determine at what time the voltage induced in the base winding 26 as a result of the change in the flux-saturation of the magnetic core 10 has sufficient amplitude (is sufficiently negative) to trigger the transistor 40 into a conducting condition. The normal switching time of the transistor 40 is advanced in time at the modulation rate when the modulating signal is more negative or retarded in time at the modulation rate when the modulating signal is more positive. As the magnetic core 10 shifts from a "one" into a "zero" state and transistor 40 conducts, a current pulse appears in the collector circuit of the transistor 40 whose time is a function of the modulating signal supplied by the signal generator 45 during the sampling interval in which the magnetic core 10 changes state. The time modulated current pulse is fed over lead 49 to the output circuit 53. In this manner, pulse time or position modulation is obtained.

As the single electrical condition or "one" state is advanced along the chain of magnetic cores 10 through 13 by the two trains 55, 56 of advance pulses generated by the pulse generator 34, each of the magnetic core-transistor circuits will be operated in turn and in the manner described to produce a modulated current pulse whose time is a function of the modulating signal supplied thereto during the interval in which the magnetic core changes from a "one" to a "zero" state. Each of the magnetic core-transistor circuits performs both a commutating and pulse time modulating function. The time modulated output pulses produced sequentially by the respective magnetic core-transistor circuits are fed over leads 49 through 52 to the output circuit 53. The output circuit 53 may include unidirectional current conducting devices poled in the proper direction to pass only the desired time modulated output pulses appearing over the leads 49 through 52, the time modulated output pulses being applied in sequential, multiplex fashion over a single circuit to output terminal 54 for application to a utilization circuit. While the modulated output signals are shown as taken from the collector circuits, the output signals could be taken in other applications from the emitter or base circuits of the transistors 40 through 43 or from a core winding with the use of a diode clipping device. Instead of being included in the base circuits of the transistors 40 through 43 as shown in Figure 1, the respective modulating signal sources 45 through 48 may be included in either the emitter or collector circuits of the transistors 40 through 43. In such modifications, the operation will be the same as described.

A pulse time multiplex modulation system according to the invention has been shown and described in connection with Figure 1. The invention is, however, not limited to the particular arrangement shown in Figure 1. Referring to Figure 2, a further embodiment of the invention in the form of a pulse amplitude multiplex modulation system is shown.

Four magnetic cores 60 through 63 each having seven windings wound thereon are connected to form a chain of magnetic cores. Reading in a counter-clockwise direction, the windings are designated as an advance winding 64 through 67, an input winding 68 through 71, set winding 72 through 75, signal input winding 76 through 79, base winding 80 through 83, collector winding 84 through 87 and output winding 88 through 91, respectively. The advance windings 64 through 67 are connected in series over a lead 92 to an advance pulse generator 93. The advance pulse generator 93 may be of the same general construction as the pulse generator 34 shown in Figure 1 and is arranged to supply a continuous train of advance pulses occurring at regular intervals over lead 92. As in the case of the pulse generator 34, the pulse generator 93 may be designed to supply pulses of a unidirectional waveshape having a sloping edge. The pulses may, for example, have a three microsecond width at fifty percent of peak amplitude. The type of advance drive shown in Figure 2 is generally referred to as a single-core-per-bit advance as compared to the advance drive shown in Figure 1 which is generally referred to as a two-core-per-bit advance.

The set windings 72 through 75 are connected in series over an electrical path including lead 94, on-off switch 95, resistor 125 and battery 96. Set windings 73 through 75 are wound in the direction such that a voltage induced therein upon the closing of switch 95 causes each of the respective magnetic cores 61 through 63 to be shifted into or remain in a "zero" state. The set winding 72 is wound on the magnetic core 60 in the proper direction to cause the magnetic core 60 to be either shifted into or remain in the "one" state upon the closing of the switch 95.

A separate P–N–P junction transistor of N type conductivity is regeneratively connected to each of the magnetic cores 60 through 63. The transistors 97 through 100 are normally nonconducting and may be of the type designated as 2N105. However, other types of P–N–P junction transistors may be used, depending upon the requirements of a particular application. The base electrode of the transistor 97 is connected through the base winding 80 to ground, the emitter electrode being connected to ground. The collector electrode of the transistor 97 is connected to ground over an electrical path including the collector winding 84, input winding 69 on the magnetic core 61 and a capacitor 101. A resistor 102 is connected across the input winding 69 and capacitor 101 to the negative terminal 110 of a source of potential. The succeeding magnetic cores in the chain are connected in a similar manner. Thus, the magnetic core 61 is connected to the magnetic core 62 by a circuit arrangement including transistor 98, the collector winding 85, input winding 70, resistor 103 and capacitor 104. The magnetic core 62 is connected to the magnetic core 63 by a circuit arrangement including transistor 99, collector winding 86, input winding 71, resistor 105 and capacitor 106. In order to provide the necessary ring counter action, the last magnetic core 63 is connected to the first magnetic core 60 by a circuit arrangement including transistor 100, collector winding 87, resistor 107, lead 108, input winding 68 and capacitor 109.

Separate signal generators 112 through 115 are individually connected to ground through their respective signal input windings 76 through 79. The signal generators 112 through 115 may be designed to supply voice, tone or other modulating signal energy. The output windings 88 through 91 are individually connected over separate leads 116 through 119, respectively, to a common output circuit 120. The modulated output signals produced in a manner to be described and applied over leads 116 through 119 are combined in multiplex fashion by the output circuit 120 and applied over a single communication path to an output terminal 121. The output circuit 120 may include unidirectional current conducting devices in each of the leads 116 through 119 poled in the proper direction to pass only the desired modulated output signals applied over the respective leads.

In operation, switch 95 is closed. The voltage induced in the set windings 73 through 75 causes the magnetic cores 61 through 63 each to assume or remain in a "zero" state. The voltage induced in the set winding 72 causes magnetic core 60 to assume or remain in a "one" state, since the winding 72 is wound on the magnetic core 60 in a direction opposite to that in which the windings 73, 74 and 75 are wound on the magnetic cores 61, 62 and 63, respectively. The advance windings 64 through 67 are wound on the respective magnetic cores 60 through 63 in a direction to cause the magnetic cores 60 through 63 each to assume a "zero" state upon the application by the pulse generator 93 of an advance pulse over lead 92. Upon the application to the advance windings 64 through 67 of the next advance pulse, following the operation of switch 95, the status of the magnetic cores 61 through 63 which are already in a "zero" state will be confirmed. Since the magnetic core 60 is by the action of switch 95 in a "one" state, the voltage induced in the advance winding 64 causes the magnetic core 60 to start to change state. A negative voltage is induced in the base winding 80 of transistor 97. The emitter electrode becomes sufficiently more positive with respect to the base electrode to cause transistor 97 to conduct.

Capacitor 101 is normally charged negatively with respect to ground in a manner to be described. When the transistor 97 begins to conduct, capacitor 101 discharges and current flows over an electrical path including input winding 69, collector winding 84 and transistor 97. The voltage induced in the collector winding 84 results in a more negative voltage being induced in the base winding 80. By this regenerative action, transistor 97 conducts more heavily and the magnetic core 60 is made to assume a "zero" state. The input winding 69 is wound on the magnetic core 61 in a direction such that the voltage induced in the input winding 69 during the period in which transistor 97 is conducting functions to assist the voltage induced in the advance winding 65 by the reception of the advance pulse in holding the magnetic core 61 in a "zero" state.

When the magnetic core 60 has assumed a "zero" state, the magnetic coupling therethrough drops substantially to zero and transistor 97 ceases conducting. Capacitor 101 charges through the resistor 102 from the negative terminal 110. A current of opposite polarity now flows through the input winding 69 and the voltage thereby induced in the input winding 69 causes the magnetic core 61 to assume a "one" state. The time constant of the resistor 102-capacitor 101-transistor 97 network is set and the frequency of the advance pulses is determined so that the current reversal occurs after the advance pulse applied to the advance windings 64 through 67 has terminated. The single electrical condition or "one" has, therefore, been advanced from the magnetic core 60 to the magnetic core 61.

As additional advance pulses are applied at regular intervals to the advance windings 64 through 67 from the pulse generator 93, the "one" state will be advanced from magnetic core to magnetic core along the chain on a continuous basis, following the circuit operations described. By this action, first one and then another of the magnetic cores 60 through 63 is made to assume a "one" state, only one of the magnetic cores 60 through 63 being in a "one" state at a time. A ring counter or commutator is provided in that the advancement of the single electrical condition or "one" state along the chain results in the sequential operation of the magnetic cores 60 through 63.

Referring to the magnetic core 61-transistor 98 circuit and to the description of the transfer of the "one" state from magnetic core 60 to magnetic core 61 given above, a modulating signal supplied by the signal generator 113 is inductively coupled to the magnetic core 61 by means of the signal input winding 77. The voltage induced in the signal input winding 77 effectively varies the degree of saturation or set of the magnetic core 61 at the modulation rate. The magnetic state of the magnetic core 61 is varied as a function of the modulating signal. In a sense, the modulating signal serves to bias the magnetic core 61 to a point on the characteristic BH operating curve of the core corresponding to the level of the modulating signal. When the capacitor 101 recharges and a voltage is induced in the input winding 69 of the proper polarity to cause the magnetic core 61 to shift into a "one" state, the degree of flux change in the magnetic core 61 necessary to place the core in a "one" state is determined according to the point of saturation at which the core is set by the modulating signal or voltage induced in the signal input winding 77. In effect, the voltage induced in the input winding 69 and the voltage induced in the signal input winding 77 are automatically compared in the magnetic core 61 to determine the voltage level necessary to complete the shift in state of the magnetic core 61. This action results in a pulse being produced in the output winding 89 whose amplitude corresponds to the degree of flux change in the magnetic core 61 and is, therefore, a function of the modulating signal supplied by the signal generator 113 during the sampling period in which the magnetic core 61 is changing from a "zero" to a "one" state. A voltage pulse is also induced in the base winding 81 but is of the improper polarity to cause transistor 98 to conduct. Transistor 98 is made conducting upon the reception of the next advance pulse by the advance winding 65, resulting in the "one" state being transferred from the magnetic core 61 to the magnetic core 62, and so on.

The amplitude modulated pulse appearing at the output winding 89 is applied over the lead 117 to the output circuit 120. As additional advance pulses are applied to the advance windings 64 through 67 and the "one" state is advanced along the chain of magnetic cores, amplitude modulated pulses representative of the modulating signals supplied by the signal generators 112 through 115 will sequentially appear at the respective output windings 88 through 91. Each of the magnetic core-transistor circuits is operated in turn and in the manner described to produce a modulated pulse whose amplitude is a function of the modulating signal supplied to the magnetic core during the period in which the magnetic core changes from a "zero" to a "one" state. A commutating and modulating function is performed by each of the magnetic core-transistor circuits in the chain. The amplitude modulated output pulses sequentially produced by the circuit operations described are applied from the output windings 88 through 91 over the respective leads 116 through 119 to the output circuit 120. The output circuit 120 may include the usual unidirectional devices poled in the proper direction to pass only the desired amplitude modulated pulses appearing over the leads 116 through 119. The output circuit 120 functions to apply the amplitude modulated pulses over a single communication path in multiplex fashion for application to a utilization circuit via output terminal 121.

The pulse time multiplex modulation system shown in Figure 1 includes a two-core-per-bit advance drive. While such a driving system offers advantages as to speed of operation, and so on, it is possible in certain applications to instead use the single-core-per-bit advance drive constructed as described in connection with the pulse amplitude multiplex modulation system shown in Figure 2. It would only be necessary to connect the advance windings 14 through 17 in series for operation in response to advance pulses supplied over a single lead connected to the pulse generator 34 and to insert the resistor-capacitor coupling arrangement between the succeeding magnetic cores in the chain.

While P–N–P junction transistors of N type conductivity have been described in connection with the circuit arrangements shown in Figures 1 and 2, the invention is not limited to the use of this particular type of transistor. Other types of transistors including N–P–N junction transistors of P type conductivity, as well as N or P point contact transistors, could be used by merely altering the electrode connections and the polarity of the voltages supplied thereto in a known manner. In the operation of the arrangements shown in Figures 1 and 2, the respective pulse generators 34, 93 are arranged to supply advance pulses to each magnetic core at a frequency rate which is at least twice and preferably more than twice the frequency rate of the modulating signal energy supplied by the signal generators.

In describing the invention, reference has been made to the four channel multiplex modulation systems shown in Figures 1 and 2. In practice, the modulation systems may be arranged to include any number of different channels by merely adding to or subtracting from the chains a desired number of magnetic core-transistor circuits. The output circuits of the respective magnetic core-transistor circuits in the chains have been shown and described as connected to a common output circuit for four channel multiplex operation. However, the output circuits of the magnetic core-transistor circuits in a chain may be individually connected to different utilization circuits or may be arranged in groups for connection through separate common output circuits to different utilization circuits, according to the requirements of a particular application.

By utilizing a transistorized magnetic core ring counter circuit, the invention provides a multiplex modulation system which is both small and compact in construction. Because of the type of components used, the system is also light in weight, consuming low power and requiring low signal drive. The invention is particularly suitable for use in telemetering and other applications where size and weight are important factors.

Having described the invention, we claim:

1. In combination, a chain of magnetic cores, each of said magnetic cores being capable of assuming either one of two stable states and having first and second windings mounted thereon, a plurality of transistor devices each having an output electrode individually coupled to a different one of said first windings, said transistor devices each including an input electrode, a plurality of sources of modulating signal energy, means to couple the input electrode of each of said transistor devices to a different one of said sources through the second winding on that magnetic core coupled to the same transistor device by the first winding thereon, whereby each of said magnetic cores has a transistor device regeneratively coupled thereto over a path including a source of modulating signal energy, means to place only one of said magnetic cores in one of said states and the other magnetic cores in said other state, and means for sequentially operating said magnetic cores to cause said transistor devices to produce during separate and distinct time periods output pulses time modulated according to the amplitude of the modulating signal energy supplied by the respective sources coupled thereto.

2. In a combination as claimed in claim 1, a common output circuit, and means to apply said time modulated pulses from the output electrodes of each of said transistors to said output circuit.

3. In a combination as claimed in claim 1, said means for sequentially operating said magnetic cores including an advance pulse generator, means to apply said advance pulses from said generator to said magnetic cores to cause said one state to be advanced at spaced intervals from magnetic core to magnetic core along said chain.

4. In a combination as claimed in claim 1, said transistor devices being P–N–P junction transistors of N type conductivity having base, emitter and collector electrodes, said output electrode being the collector electrode and said input electrode being the base electrode, means to connect the emitter electrode of each of said transistors to a point of reference potential.

5. A multiplex modulation system comprising, in combination, a chain of magnetic cores, each of said magnetic cores being capable of assuming either one of two stable states and having first and second windings mounted thereon, a plurality of transistor devices each having a collector electrode individually coupled to a different one of said first windings, said transistor devices each including a base electrode and an emitter electrode, a plurality of sources of modulating signal energy, the signal energy supplied by each source being different from that supplied by the other sources, means to couple the base electrode of each of said transistor devices to a different one of said sources through the second winding on that magnetic core coupled to the same transistor device by the first winding thereon, means to couple each of said emitter electrodes to a point of reference potential, whereby each of said magnetic cores has a transistor device regeneratively coupled thereto over a path including a source of modulating signal energy, means to place only one of said magnetic cores in one of said states and the other magnetic cores in said other state, pulse driving means for pulsing said magnetic cores to cause said transistor devices to conduct sequentially and to produce at said collector electrodes during separate and distinct time periods output pulses time modulated according to the amplitude of the modulating signal energy supplied by the respective sources, a common output circuit coupled to each of said collector electrodes and arranged to combine said time modulated output pulses in multiplex fashion for transmission as a single multiplex signal.

6. A multiplex modulation system as claimed in claim 5 and wherein said pulse driving means includes a generator arranged to supply advance pulses of unidirectional waveshape with a sloping edge, means to apply said advance pulses from said generator to said magnetic cores to cause said one state to be advanced from magnetic core to magnetic core along said chain.

7. In combination, a train of magnetic core circuits connected to form a ring counter, said magnetic cores being characterized by an abrupt change in flux density when an applied magnetizing force exceeds a threshold value, each of said circuits including a transistor regeneratively connected to said magnetic core, separate individual sources of modulating signal energy singly connected over different paths to said magnetic cores, means to supply a series of sawtooth waves to said magnetic cores for continually advancing a single electrical condition from magnetic core to magnetic core along said train to place first one and then another of said magnetic core circuits in operation, said magnetic core circuits being sequentially placed in operation for separate and distinct time intervals to each produce in turn a time modulated pulse determined by the time at which the amplitude of the modulating signal energy plus the amplitude of the sawtooth supplied to the magnetic core therein during said interval exceeds said threshold value, a common output circuit connected to the output of each of said magnetic core circuits for combining said sequentially produced time modulated pulses into a multiplex signal for transmission over a single transmission path.

References Cited in the file of this patent

UNITED STATES PATENTS

| | | |
|---|---|---|
| 2,659,866 | Landon | Nov. 17, 1953 |
| 2,772,357 | Wang | Nov. 27, 1956 |
| 2,772,370 | Bruce et al. | Nov. 27, 1956 |
| 2,803,812 | Rajchman et al. | Aug. 20, 1957 |
| 2,816,169 | Pawley | Dec. 10, 1957 |
| 2,866,178 | Lo et al. | Dec. 23, 1958 |